US009114319B2

(12) United States Patent
Joynes et al.

(10) Patent No.: US 9,114,319 B2
(45) Date of Patent: *Aug. 25, 2015

(54) GAME CONTROLLER

(71) Applicant: Wikipad, Inc., Westlake Village, CA (US)

(72) Inventors: Matthew R. Joynes, Agoura Hills, CA (US); James Bower, Windermere, FL (US); Kelly Gamble, Westlake Village, CA (US)

(73) Assignee: Wikipad, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,470

(22) Filed: May 22, 2014

(65) Prior Publication Data

US 2014/0256443 A1 Sep. 11, 2014

Related U.S. Application Data

(63) Continuation-in-part of application No. 13/494,801, filed on Jun. 12, 2012.

(51) Int. Cl.
*A63F 9/24* (2006.01)
*A63F 13/20* (2014.01)
*A63F 13/90* (2014.01)

(52) U.S. Cl.
CPC .............. *A63F 13/06* (2013.01); *A63F 13/08* (2013.01); *A63F 2300/1043* (2013.01); *A63F 2300/204* (2013.01)

(58) Field of Classification Search
None
See application file for complete search history.

(56) References Cited

U.S. PATENT DOCUMENTS 5,629,733 A 5/1997 Youman et al.
5,740,389 A 4/1998 Li et al.
(Continued)

FOREIGN PATENT DOCUMENTS

WO WO 03044625 5/2003

OTHER PUBLICATIONS

Chartier; "Preorders begin for iPhone, iPod touch game controller." Published Feb. 8, 2011; in Macworld website (online); http://www.macworld.com/article/1157741/icontrolpad.html; entire document especially p. 1.

(Continued)

*Primary Examiner* — Jason Yen
(74) *Attorney, Agent, or Firm* — Hall Estill Attorneys at Law

(57) ABSTRACT

An apparatus generally directed to controlling a video game. The apparatus preferably includes a wireless communications enabled computing device, an electronic game communicating with the wireless communications enabled computing device, and an input device for controlling movement of a virtual object provided by the electronic game. Preferably, the input device includes a pair of opposing side structures adjacent opposing sides of plurality of sides of the wireless communications enabled computing device. The input device further preferably includes a plurality of input switches, wherein said input switches are adjacent each of the at least two opposing sides of the plurality of sides of the wireless communications enabled computing device. In a preferred embodiment, the input device masks less than a majority of the back of the wireless communications enabled computing device.

18 Claims, 7 Drawing Sheets

(56) References Cited

U.S. PATENT DOCUMENTS

| | | | |
|---|---|---|---|
| 5,967,898 | A | 10/1999 | Takasaka et al. |
| 5,976,018 | A | 11/1999 | Druckman |
| 6,153,843 | A * | 11/2000 | Date et al. .................... 200/339 |
| 6,290,565 | B1 | 9/2001 | Galyean, III et al. |
| 6,532,152 | B1 | 3/2003 | White et al. |
| 6,710,764 | B1 | 3/2004 | Burgel et al. |
| 7,200,702 | B2 | 4/2007 | Keely et al. |
| 7,298,613 | B2 | 11/2007 | Yin et al. |
| 7,653,771 | B2 | 1/2010 | Liberty |
| 7,746,629 | B2 | 4/2010 | Chiu et al. |
| 7,733,637 | B1 | 6/2010 | Lam |
| 7,758,424 | B2 | 7/2010 | Riggs et al. |
| 7,774,155 | B2 | 8/2010 | Sato et al. |
| 7,818,668 | B2 | 10/2010 | Michelstein et al. |
| 7,833,097 | B1 | 11/2010 | Maddox et al. |
| 7,852,322 | B2 | 12/2010 | Park |
| 7,933,118 | B2 | 4/2011 | Chiu et al. |
| 7,942,745 | B2 | 5/2011 | Ikeda et al. |
| 8,018,098 | B2 | 9/2011 | Lu et al. |
| 8,100,769 | B2 | 1/2012 | Rabin |
| 8,100,770 | B2 | 1/2012 | Yamazaki et al. |
| 8,180,295 | B2 | 5/2012 | Mao |
| 8,188,977 | B2 | 5/2012 | Kuwaki et al. |
| 8,192,285 | B2 | 6/2012 | Cheng et al. |
| 2002/0155890 | A1 * | 10/2002 | Ha et al. ..................... 463/36 |
| 2003/0147008 | A1 | 8/2003 | Liu |
| 2003/0231189 | A1 | 12/2003 | Williams |
| 2004/0082385 | A1 * | 4/2004 | Silva et al. ................... 463/40 |
| 2004/0224638 | A1 * | 11/2004 | Fadell et al. ................. 455/66.1 |
| 2005/0272471 | A1 | 12/2005 | Sherman |
| 2006/0048076 | A1 | 3/2006 | Vronay et al. |
| 2006/0250367 | A1 | 11/2006 | Tabasso et al. |
| 2006/0291156 | A1 | 12/2006 | Allen |
| 2007/0159466 | A1 | 7/2007 | Kawell et al. |
| 2007/0268247 | A1 | 11/2007 | Quatro |
| 2009/0036189 | A1 * | 2/2009 | Wang ............................. 463/16 |
| 2009/0209288 | A1 | 8/2009 | Rofougaran |
| 2009/0291760 | A1 | 11/2009 | Hepburn et al. |
| 2010/0069160 | A1 * | 3/2010 | Barrett et al. .................. 463/46 |
| 2010/0081505 | A1 * | 4/2010 | Alten et al. .................... 463/36 |
| 2010/0103141 | A1 | 4/2010 | Challener et al. |
| 2010/0250815 | A1 | 9/2010 | Street et al. |
| 2011/0098111 | A1 | 4/2011 | Saito et al. |
| 2011/0118022 | A1 | 5/2011 | Aronzon et al. |
| 2011/0126156 | A1 | 5/2011 | Krishnaraj et al. |
| 2011/0242138 | A1 | 10/2011 | Tribble |
| 2011/0260969 | A1 | 10/2011 | Workman |
| 2012/0108335 | A1 | 5/2012 | Liotta et al. |
| 2012/0169597 | A1 | 7/2012 | Liotta |
| 2012/0236485 | A1 | 9/2012 | Staats et al. |

OTHER PUBLICATIONS

Wattanajantra; "iControlPad unofficial iPhone gamepad coming soon." in c/net UK website (online); Published Aug. 27, 2010; http://crave.cnet.co.uk/mobiles/icontrolpad-unofficial-iphone-gamepad-coming-soon-50000514; entire document, especially pp. 3, 4.

* cited by examiner

GAME CONTROLLER

RELATED APPLICATIONS

This application is a continuation-in-part of U.S. patent application Ser. No. 13/494,801 filed on Jun. 12, 2012, which in turn claims priority to U.S. Provisional Patent application Ser. No. 61/577,709 filed on Dec. 20, 2011.

SUMMARY

In a preferred embodiment an apparatus includes a wireless communications enabled computing device, the wireless communications enabled computing device preferably providing a plurality of sides, each of the plurality of sides are disposed between an electronic display screen and a back of the wireless communications enabled computing device, and an electronic game communicating with the wireless communications enabled computing device. The electronic game preferably provides an object displayed on the electronic display screen of the wireless communications enabled computing device, and movement of the object is controlled by an input device.

In a preferred embodiment, the input device includes at least a pair of side structures, one of the pair of side structures is adjacent to and confines the wireless communications enabled computing device on a first side of the plurality of sides of the wireless communications enabled computing device, the second side structure of the pair of side structures is adjacent to and confines the wireless communications enabled computing device on a second side of the plurality of sides of the wireless communications enabled computing device, wherein the first and second sides of the plurality of sides of the wireless communications enabled computing device are opposing sides of the plurality of sides of the wireless communications enabled computing device. The input device further preferably includes a plurality of input switches, wherein the input switches are adjacent each of the at least two opposing sides of the plurality of sides of the wireless communications enabled computing device. In a preferred embodiment, the input device masks less than a majority of the back of the wireless communications enabled computing device, and the pair of side structures communicate with each other wirelessly.

DETAILED DESCRIPTION

The present disclosure generally relates to an apparatus directed to controlling electronic games, also referred to herein as video games, or computer games. The apparatus preferably includes a wireless communications enabled computing device, an electronic game communicating with the wireless communications enabled computing device, and an input device for controlling movement of a virtual object provided by the electronic game. Preferably, the input device includes a pair of opposing side structures adjacent opposing sides of plurality of sides of the wireless communications enabled computing device. The input device further preferably includes a plurality of input switches, wherein said input switches are adjacent each of the at least two opposing sides of the plurality of sides of the wireless communications enabled computing device, and a bridge structure disposed between the pair of sides to form a three sided structure. The third structure mitigates inadvertent removal of the wireless communications enabled computing device from the three sided structure when the wireless communications enabled computing device is fully nested within the three sided structure.

Figure 1:
FIG. 1 is a front perspective view, with partial cutaway, of an embodiment an electronic game control apparatus constructed and operated in accordance with various embodiments disclosed and claimed herein.

Turning to the drawings, FIG. 1 provides an exemplary game controller 100 capable of being used in accordance with various embodiments of the present invention. The exemplary game controller 100 has at least a tablet computer 102 (also referred to herein as a wireless communications enabled computing device 102) that providing a plurality of sides, such as 104, 106, 108, and 126. Each of the plurality or sides 104, 106, and 108 are disposed between an electronic display screen 110, of the tablet computer 102, and a back 112 (shown by FIG. 2) of the tablet computer 102 operates. The exemplary game controller 100 further preferably includes an input device 114.

In a preferred embodiment, the input device 114 provides a pair of side structures, 116 and 118. One of the pair of side structures, for example 116, is adjacent to and confines the tablet computer 102 on a first side, such as 104 of the plurality of sides 104, 106, 108, and 126 of the tablet computer 102. The second side structure of the pair of side structures, such as 118, is adjacent to and confines the tablet computer 102 on a second side, such as 108, of the plurality of sides 104, 106, 108, and 126 of the tablet computer 102, wherein the first and second sides, such as 104 and 108, of the plurality of sides 104, 106, 108, and 126 of the tablet computer 102 are opposing sides of the plurality of sides 104, 106, 108, and 126, of the tablet computer 102. In a preferred embodiment, the pair of side structures 116, 118 communicate with one another through a serial IO. However, as those skilled in the art will recognize, the communication link between the side structures 115, 118 is not limited to a serial IO, but may be achieved by USB protocol, and further that the communication link may be wirelessly achieved through a communication protocol such as Bluetooth.

In a preferred embodiment, the input device 114 further provides a plurality of input switches 120 and 122, wherein the input switches 120 and 122 are adjacent each of the at least two opposing sides 104 and 108, of the plurality of sides 104, 106, 108, and 126, of the tablet computer 102, and a bridge structure 124, disposed between the pair of side structures 116 and 118, and adjacent the third side 126, of the plurality of sides 104, 106, 108, and 126, of the tablet computer 102. The bridge structure 124 in combination with the pair of side structures 116 and 118 form a three sided structure 128 (of FIG. 5) also referred to herein as a u-shaped structure 128 of the input device 114), in which the tablet computer 102 nests, such that the tablet computer 102 is confined by the u-shaped structure 128, and the u-shaped structure 128 mitigates inadvertent removal of the tablet computer 102 from the u-shaped structure 128 when the tablet computer 102 is fully nested within the three sided structure 128.

The exemplary game controller 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of as character. It is noted that FIG. 1 displays the housings 119 of the plurality of switches 120, whereas at least some of the plurality of switches are shown in the partial cutaway of FIG. 3, and whereupon a manual intervention of a housing 119 of a selected switch of the plurality of switches 120, the selected switch produces a predetermined signal that is provided by the selected switch to the tablet computer 102.

Figure 2:
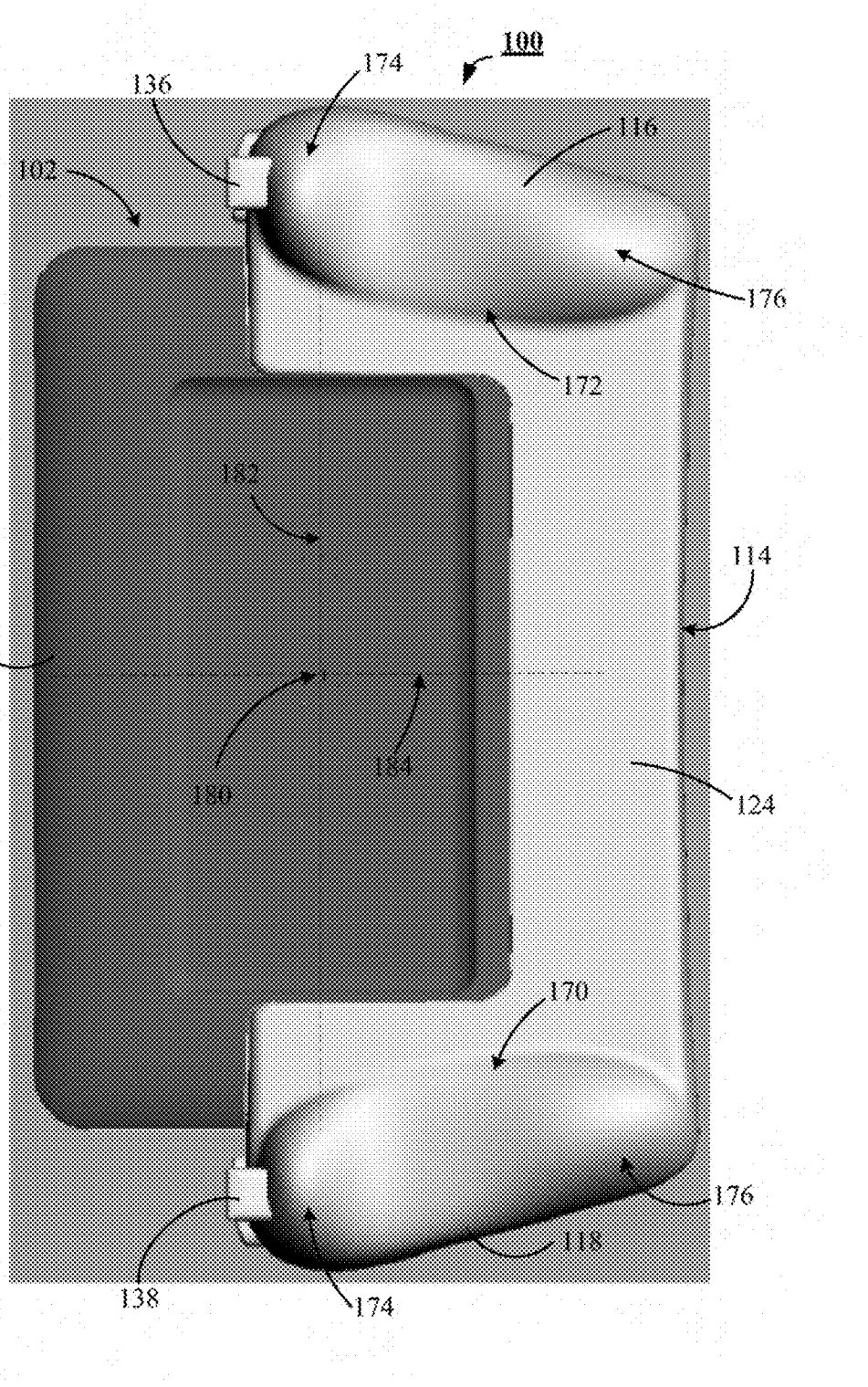
FIG. 2 shows a back plan view of the apparatus of FIG. 1.

FIG. 2 depicts the exemplary game controller 100, and reveals the back 112 of the tablet computer 102 (also referred to herein as a wireless communications enabled computing device 102). Further shown by FIG. 2, is the input device 114, which provides a pair of trigger switches 136 and 138, supported by their corresponding side structures 116 and 118 respectively. It is noted by FIGS. 2 and 3 that the side structures 116 and 118 are ergonomically designed for hands of a user through the use of continuous, compound convex linger support surfaces 170 and 172, in conjunction with their respective associated compound, concave finger restraints 174 and 176, to fit comfortably in the hands of users over a wide range of hand sizes from children to large adults. FIG. 2 further shows a midpoint 180, of the back of the tablet computer 102, dashed line 182 passing through the midpoint 180 to more clearly show the upper half distinct from the lower half of the back of the tablet computer 102, and dashed line 184 passing through the midpoint 180 to more dearly show the right half distinctly from the left half of the tablet computer 102. The bridge structure 124 in combination with the pair of side structures 116 and 118 form a three sided structure 128 (of FIG. 5) (also referred to herein as a u-shaped structure 128 of the input device). As can be seen by FIG. 2, the u-shaped structure 128 is formed such that the input device 114 masks less than a majority (not greater than one half) of the back of the tablet computer 102 by assuring that the u-shaped structure is absent structure between the vertical portions of the u-shaped structure 128.

Figure 3:
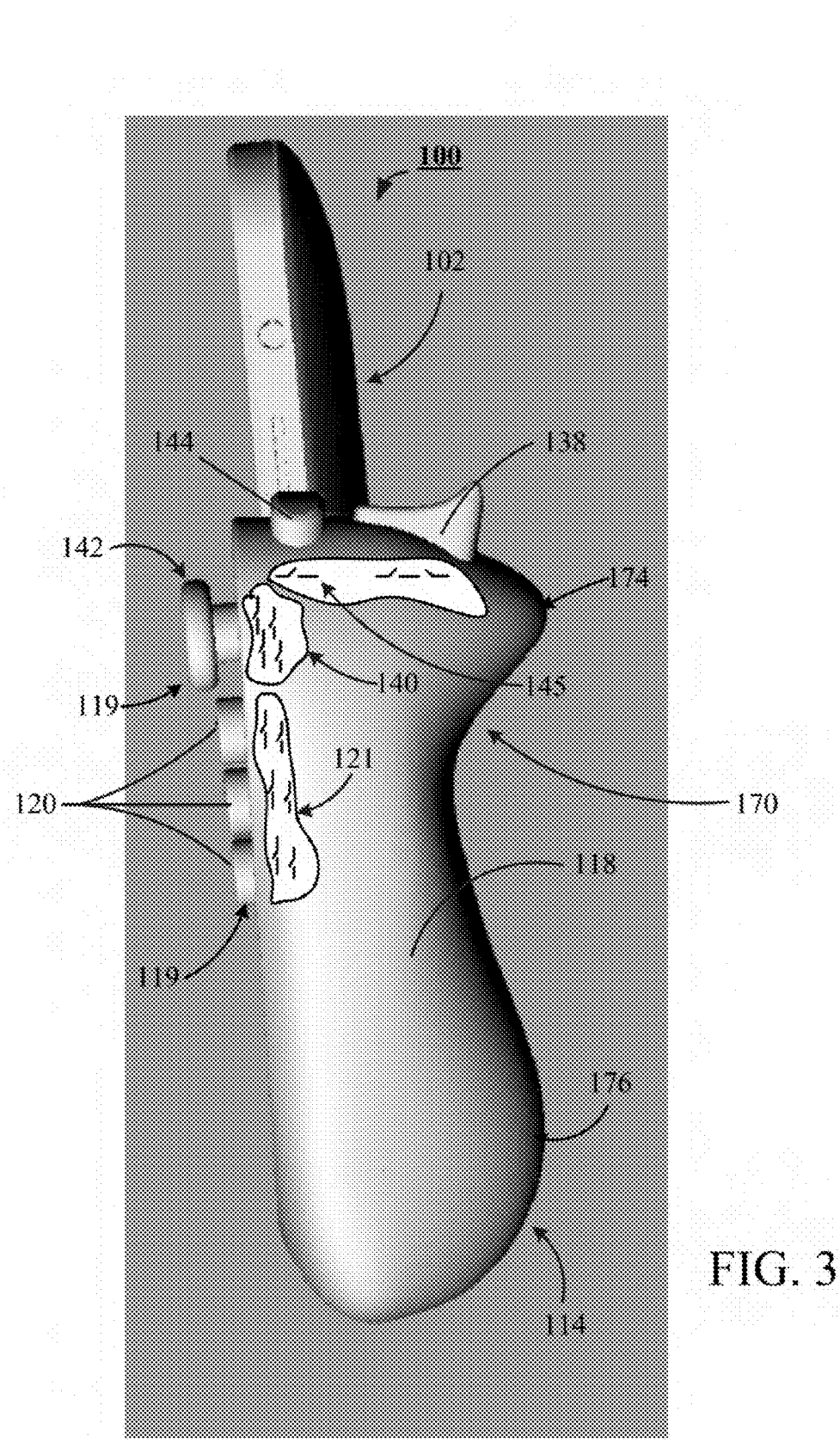
FIG. 3 displays a right side plan view, with partial cutaway, of the apparatus of FIG. 1, constructed in accordance with various embodiments disclosed and claimed herein.

Turning to FIG. 3, shows that a predetermined number of the plurality of switches 140, collaborate with each other to form an input apparatus 142, the input apparatus 142 controls display of virtual objects displayed on the electronic display screen 110 of the tablet computer 102. Preferably, the input apparatus 142 is a joystick 142. FIG. 3 further shows that the input device 114 provides a plurality of buttons 144 and 120 which activate corresponding switches 145 and 121. The main function of the trigger 138, the joystick 142, and the buttons 144 and 120 is to govern the movement/actions of a playable body/object or otherwise influence events in a video game 130 (of FIG. 1) or an alternate computer game.

Figure 4:
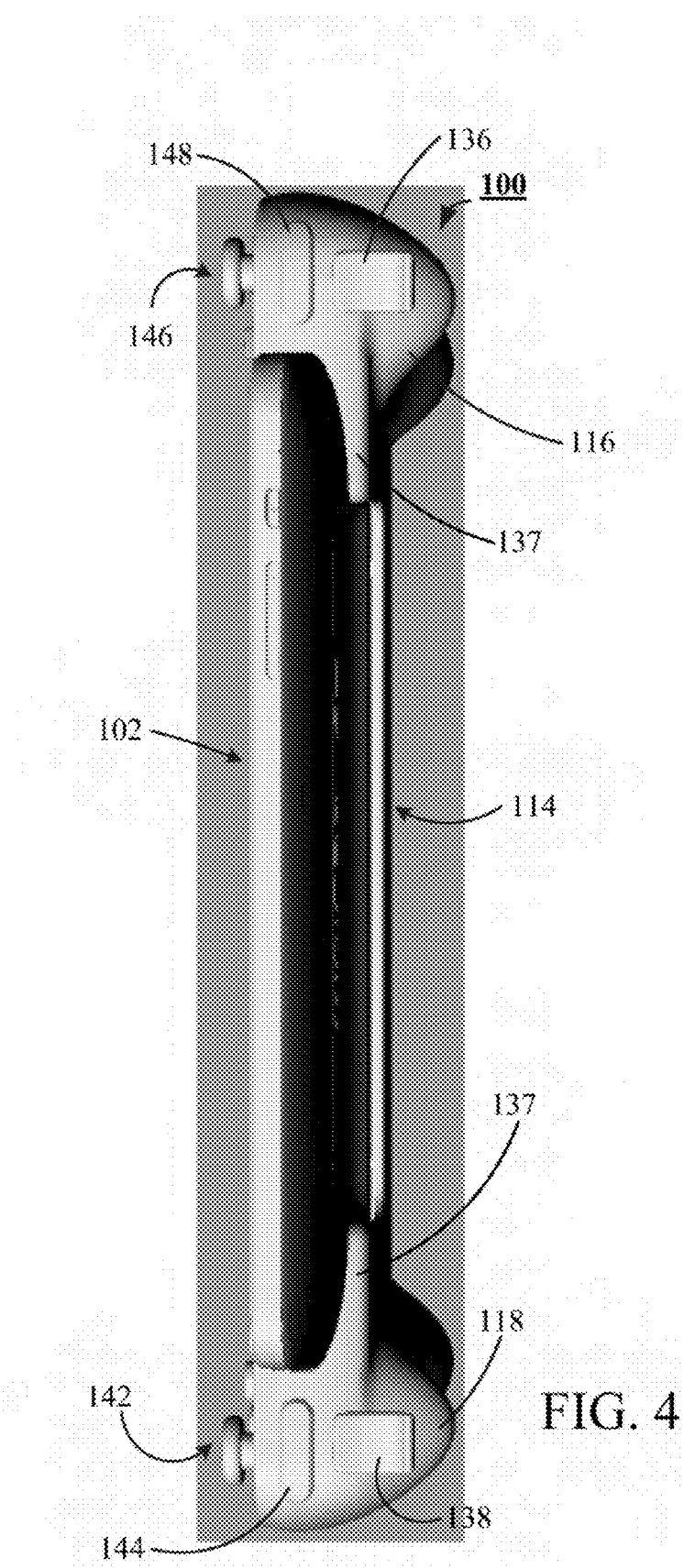
FIG. 4 depicts a right side plan view of the apparatus of FIG. 1, constructed in accordance with various embodiments disclosed and claimed herein.
Figure 5:
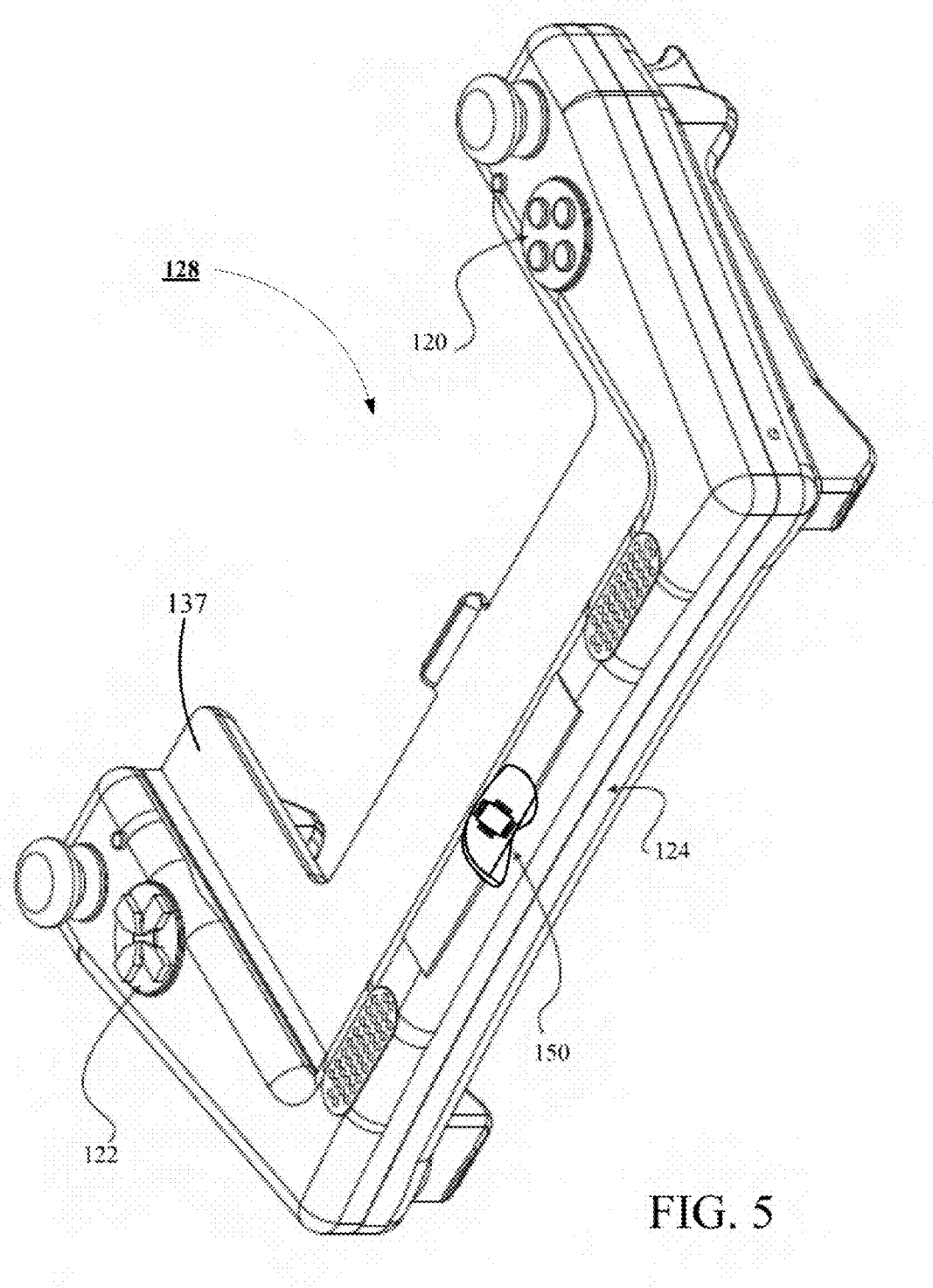
FIG. 5 illustrates a top perspective view of an embodiment of an input device of FIG. 1, constructed in accordance with various embodiments disclosed and claimed herein.

FIG. 4 shows the exemplary game controller 100, further includes a second joystick 146, and a second button 148, which are provided on the side structure 116, adjacent trigger 136, and a support flange 137, in contact adjacency with the back of the tablet computer 102. While FIG. 5 shows the central processing unit (CPU) 150, of the input device 114, and a more revealing view of the support flange 137.

Figure 6:
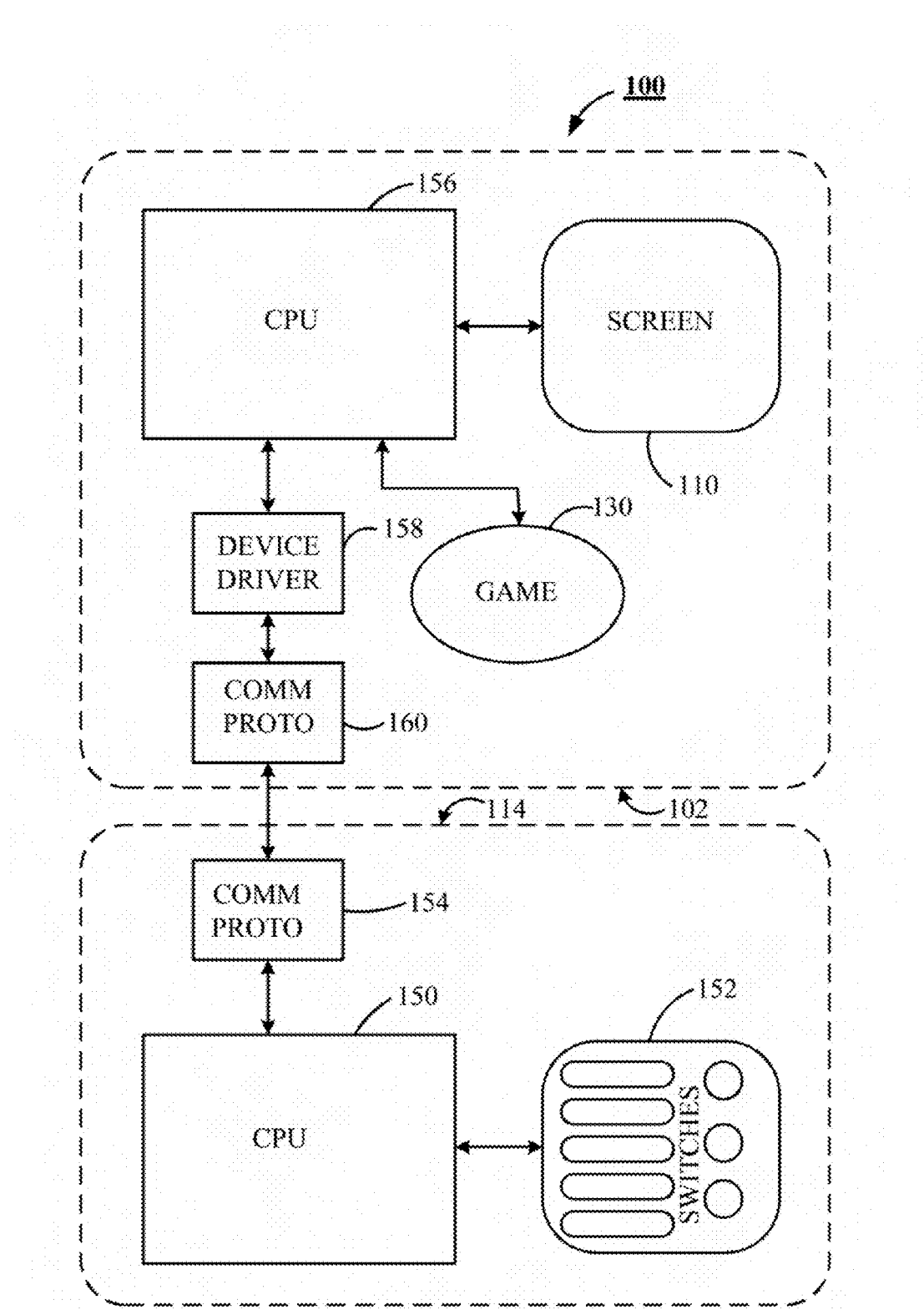
FIG. 6 is a block diagram of an embodiment of the apparatus of FIG. 1.

FIG. 6 shows the input device 114 includes the CPU 150, interacting with the plurality of switches 152, which preferably include at least switches 120, 122, 136, 138, 142, 144, 146, and 148. FIG. 6 further shows the input device 114 further includes a communications protocol 154 providing the communication link between the tablet computer 102, and the input device 114. In a preferred embodiment a Universal Serial Bus (USB) communications protocol is utilized. However, as those skilled in the art will recognize, the communications protocol 154 is not limited to a USB protocol. The communication link may be wirelessly achieved through a communication protocol such as Bluetooth.

FIG. 6 further shows that the tablet computer 102 preferably includes at least a CPU 156, interacting with the electronic display screen 110, the video game 130, a device driver 158, which facilitates the interaction between the tablet computer 102 and the input device 114, and a communications protocol 160 providing the communication link between the tablet computer 102, and the input device 114. In a preferred embodiment a Universal Serial Bus (USB) communications protocol is utilized. However, as those skilled in the art will recognize, the communications protocol 160 is not limited to a USB protocol. The communication link may be wirelessly achieved through a communication protocol such as Bluetooth.

Figure 7:
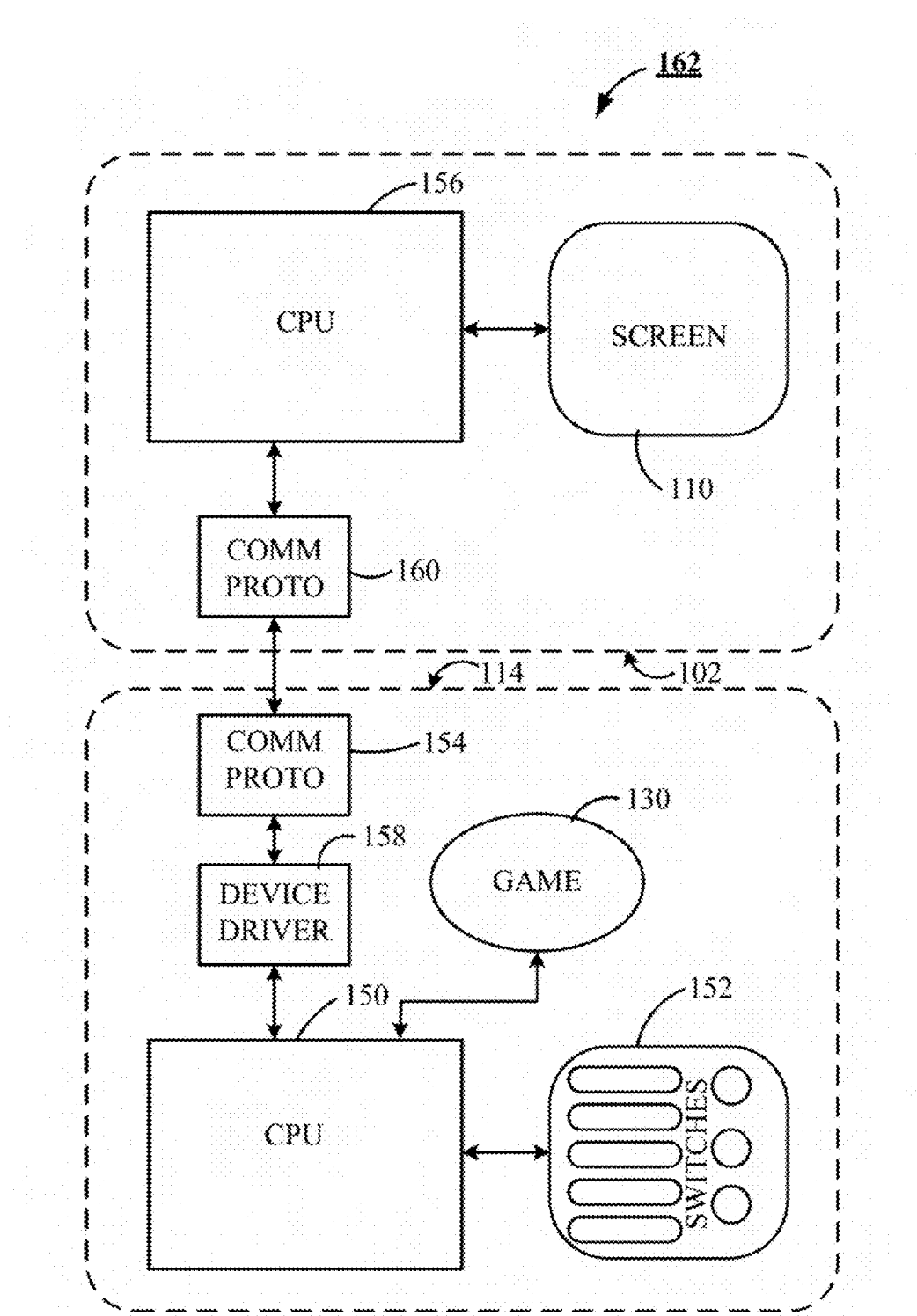
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular tablet computer without departing from the spirit and scope of the present invention.

What is claimed is:

1. A device comprising:
a wireless communications enabled computing device, the wireless communications enabled computing device providing a plurality of sides, each of the plurality of sides are disposed between an electronic display screen of the wireless communications enabled computing device and a back of the wireless communications enabled computing device;
an input device in electronic communication with the wireless communications enabled computing device, the input device providing side structures, the side structures adjacent to and confining the wireless communications enabled computing device on at least two opposing sides of the plurality of sides of the wireless communications enabled computing device, the input device providing a plurality of input switches, wherein said input switches are adjacent each of the at least two opposing sides of the plurality of sides and not more than three sides of the wireless communications enabled computing device, and in which the input device masks less than a majority of the back of the wireless communications enabled computing device, and further in which the input device further comprises a bridge structure disposed between the side structures and adjacent a third side of the plurality of sides of the wireless communications enabled computing device, the bridge structure in combination with the side structures form not more than a three sided open u-shaped structure with an absence of structure between the vertical portions of the u-shaped structure in which the wireless communications enabled computing device nests, such that the wireless communications enabled computing device is confined by the three sided structure, and the three sided structure mitigates inadvertent removal of the wireless communications enabled computing device from the three sided structure when the wireless communications enabled computing device is fully nested within the three sided structure, and wherein the side structures of the input device communicate with each other wirelessly; and a device driver communicating with each the input device and the wireless communications enabled computing device.

2. The device of claim 1, in which a predetermined number of the plurality of switches collaborate with each other to form an input apparatus, the input apparatus controls display of virtual objects displayed on the electronic display screen of the wireless communications enabled computing device.

3. The device of claim 1, in which the device driver resides on the wireless communications enabled computing device.

4. The device of claim 1, in which the device driver resides on the input device.

5. The device of claim 1, in which the input device communicates with the wireless communications enabled computing device by way of a communications protocol.

6. The device of claim 1, in which a select switch, of the plurality of switches, provides a housing, such that upon a manual intervention of the housing by a user, the switch produces a predetermined signal provided to the wireless communications enabled computing device.

7. The device of claim 1, further comprising a video game, the video game provides a virtual object displayed by the electronic display screen, the virtual object responsive to input from the input device.

8. The device of claim 1, further comprising a computer game, the computer game provides an object displayed by the electronic display screen, the object responsive to input from the input device.

9. The device of claim 1, in which the each side structure of the input device configured to fit comfortably in a hand of a user.

10. An apparatus comprising:
a wireless communications enabled computing device, the wireless communications enabled computing device providing a plurality of sides, each of the plurality of sides are disposed between an electronic display screen of the wireless communications enabled computing device and a back of the wireless communications enabled computing device;
an electronic game communicating with the wireless communications enabled computing device, the electronic game providing an object displayed on the electronic display screen of the wireless communications enabled computing device; and
means for controlling a movement or the object displayed on the electronic display screen of the wireless communications enabled computing device.

11. The apparatus of claim 10, in which the means for controlling the movement of the object displayed on the electronic display screen is provided by an input device, the input device comprises:
a pair of side structures, one of the pair of side structures is adjacent to and confines the wireless communications enabled computing device on a first side of the plurality of sides of the wireless communications enabled computing device, the second side structure of the pair of side structures is adjacent to and confines the wireless communications enabled computing device on a second side of the plurality of sides of the wireless communications enabled computing device, wherein the first and second sides of the plurality of sides of the wireless communications enabled computing device are opposing sides of the plurality of sides of the wireless communications enabled computing device, and in which the pair of side structures communicate with each other wirelessly;
a plurality of input switches, wherein said input switches are adjacent each of the at least two opposing sides of the plurality of sides of the wireless communications enabled computing device; and
wherein the input device masks less than a majority of the back of the wireless communications enabled computing device, the input device further comprising a bridge structure disposed between the pair of side structures, the bridge structure in combination with the pair of side structures form a three sided open u-shaped structure with an absence of structure between the vertical portions or the u-shaped structure in which the wireless communications enabled computing device nests such that the u-shaped structure mitigates inadvertent removal of the wireless communications enabled computing device from the u-shaped structure when the wireless communications enabled computing device is fully nested within the u-shaped structure, and in which the input device masks less than a majority of the back of the wireless communications enabled computing device.

12. The apparatus of claim 11, further comprises:
a first input/output connector provided by the wireless communications enabled computing device;
a second input/output connector provided by the input device; and
a communications protocol, the communications protocol provides structured communication between the wireless communications enabled computing device and the input device when the first and second input/output connectors are connected together.

13. The apparatus of claim 12, in which the communications protocol is a universal serial bus, and the first and second input/output connectors are universal serial bus connectors.

14. The apparatus of claim 13, in which the u-shaped structure provides support flanges in contact adjacency with the back of the wireless communications enabled computing device.

15. The apparatus of claim 14, in which a predetermined number of the plurality of switches collaborate with each other to form an input device, the input device controls movement of the object of the video game displayed on the electronic display screen of the wireless communications enabled computing device.

16. The apparatus of claim 15, in which the input device is selected from a group consisting of a trigger, a joystick, and a button.

17. The apparatus of claim 16, further comprises a device driver communicating with each the input device and the wireless communications enabled computing device.

18. The apparatus of claim 17, in which the device driver is loaded on the wireless communications enabled computing device, and the video game is loaded on the input device.

* * * * *